United States Patent
La Rosa et al.

(10) Patent No.: US 9,465,399 B2
(45) Date of Patent: Oct. 11, 2016

(54) CURRENT GENERATOR DEVICE AND METHOD OF GENERATING A CURRENT WAVE

(71) Applicant: Prodit Engineering S.p.A., Santena (IT)

(72) Inventors: Mario La Rosa, Rome (IT); Sergio Fusero, Turin (IT); Fortunato Petrocelli, Turin (IT); Giorgio Bruno Ventre, Turin (IT)

(73) Assignee: PRODIT ENGINEERING S.p.A., Santena (Torino) (IT)

( * ) Notice: Subject to any disclaimer, the term of this patent is extended or adjusted under 35 U.S.C. 154(b) by 0 days.

(21) Appl. No.: 14/397,094

(22) PCT Filed: Apr. 26, 2013

(86) PCT No.: PCT/IB2013/053316
§ 371 (c)(1),
(2) Date: Oct. 24, 2014

(87) PCT Pub. No.: WO2013/164744
PCT Pub. Date: Nov. 7, 2013

(65) Prior Publication Data
US 2015/0123642 A1    May 7, 2015

(30) Foreign Application Priority Data

Apr. 30, 2012    (IT) .............................. TO2012A0378

(51) Int. Cl.
*G05F 3/10*    (2006.01)
*G06F 1/02*    (2006.01)

(52) U.S. Cl.
CPC ................. *G05F 3/10* (2013.01); *G06F 1/022* (2013.01)

(58) Field of Classification Search
USPC .................. 327/291, 299, 72, 141, 154–155
See application file for complete search history.

(56) References Cited

U.S. PATENT DOCUMENTS 6,181,092 B1 *   1/2001   Turner .................. H02M 3/156
                                                    318/254.2
8,692,609 B2 *   4/2014   Olson .................... G01R 19/04
                                                    327/108

(Continued)

FOREIGN PATENT DOCUMENTS

FR          2 603 755          3/1988
GB          2 363 010 A        12/2001

OTHER PUBLICATIONS

PCT Application No. PCT/IB2013/053316, International Search Report and Written Opinion, mailed Aug. 27, 2013.

*Primary Examiner* — An Luu
(74) *Attorney, Agent, or Firm* — Kilpatrick Townsend & Stockton LLP

(57) ABSTRACT

A current generator device includes a processing unit including an input module designed to acquire input data representing a desired current wave. The processing unit also includes a management and control module connected to the input module and designed for receiving the input data and generating a primary voltage wave. The processing unit also includes an output module connected to the management and control module and designed to receive the primary voltage wave and to process it so as to generate an output current wave. The management and control module are further designed for receiving the output current wave from the output module and comparing the output current wave with the desired current wave and, if they are not substantially equal, modifying the primary voltage wave so as to obtain a new output current wave substantially equal to the desired current wave.

9 Claims, 3 Drawing Sheets

(56) References Cited

U.S. PATENT DOCUMENTS 8,995,150 B2 * 3/2015 Yan .................. H02M 3/33523
363/21.16

2006/0173641 A1 8/2006 Haigh et al.
2007/0296400 A1 12/2007 Andoh et al.

* cited by examiner

CURRENT GENERATOR DEVICE AND METHOD OF GENERATING A CURRENT WAVE The present invention relates to a current generator device and a current wave generation method.

More specifically, the present invention relates to a current generator and a method of generating current waveforms on the basis of input data supplied by a user.

The document RM2010U000096 discloses a current mirror device which can generate current with a waveform having a predetermined root mean square value and a predetermined frequency band.

The specific parameters of the wave generated by this device cannot be modulated or controlled dynamically, since it is impossible to modify these parameters in real time during the process of generating the wave. Furthermore, the known device cannot accurately reproduce waveforms which are acquired by means of reading instruments such as oscilloscopes and supplied to the input of the device itself.

The object of the present invention is therefore to propose a current generator device and method which are capable of dynamically generating waveforms defined by specific parameters which can be varied by the user during the process of generating the wave, and which are also capable of faithfully and accurately reproducing waveforms acquired by means of external reading instruments.

These and other objects are achieved with a current generator device whose characteristics are defined in claim 1 and with a current wave generation method as defined in claim 5.

Specific embodiments are described in the dependent claims, the content of which is to be considered as an integral and integrating part of the present description.

Further characteristics and advantages of the invention will become clear from the following detailed description, which is given purely by way of non-limiting example, with reference to the attached drawings, in which:

FIG. 1 shows a block diagram of the current generator device according to the present invention.

Figure 1:
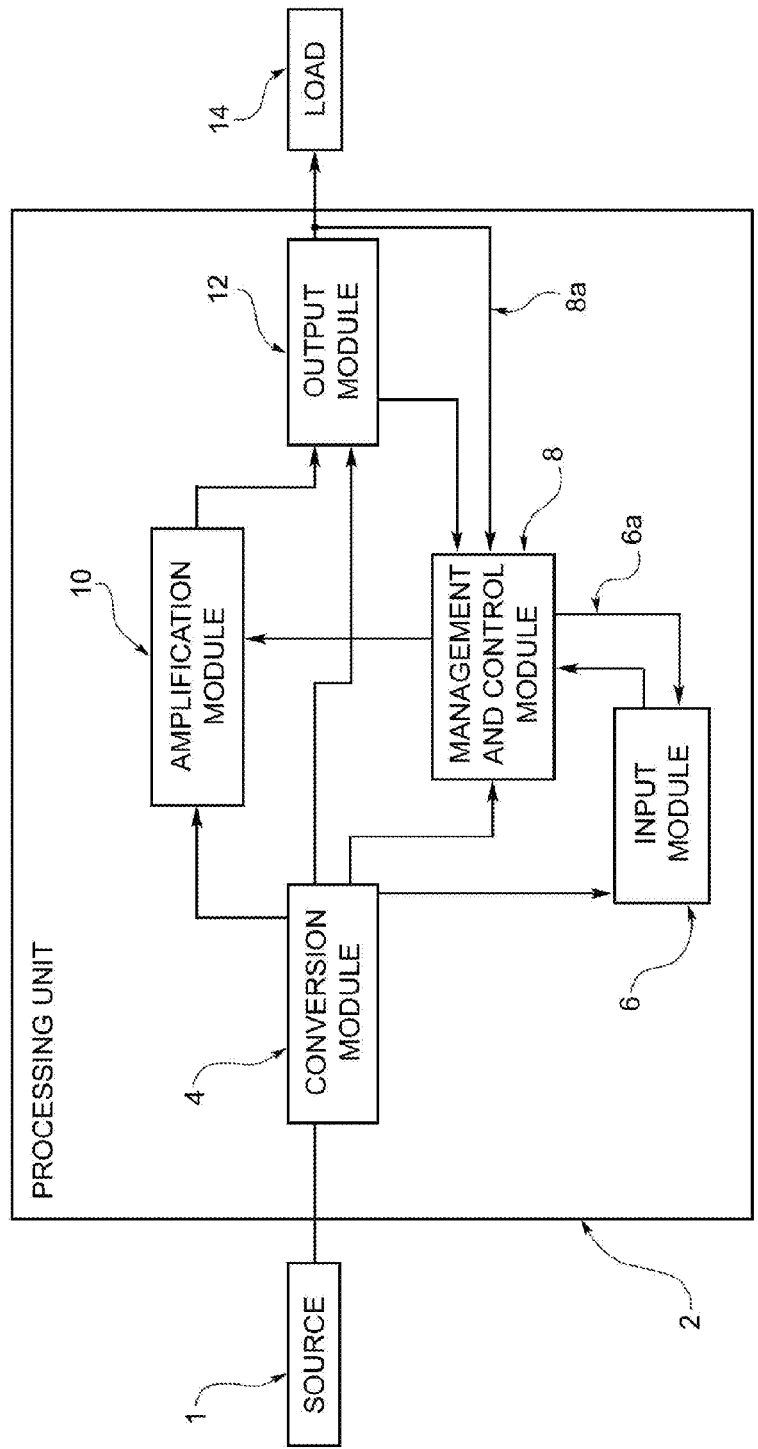
FIG. 1 is a block diagram of the device according to the present invention.

The device comprises a power source 1 connected to a processing unit 2, which in turn comprises a conversion module 4, an input module 6, a management and control module 8, an amplification module 10 and an output module 12, these components being described in detail below.

Briefly, the processing unit 2 is designed to generate an output current wave at the output of the output module 12, said output current wave being generated on the basis of digital input data supplied by a user through the input module 6 and processed by the management and control module 8 as described below.

The digital input data represent a desired current wave.

The output current wave is supplied, by the output module 12, to a load 14 having, in a known way, a resistance associated with a parasitic inductance, which combine to form the inductive impedance of the load 14.

Preferably, the output current wave has a frequency which varies within the range of 20 Hz-7 kHz and a peak value which varies within the range of 0-30 A.

The power source 1 is preferably a power distribution network of the 230 V type or a stabilized power supply apparatus of a known type.

Advantageously, it is possible to use a stabilized power supply apparatus, made in a known way, designed for receiving at its input a supply voltage signal having a predetermined value, preferably chosen from a set of values such as 110 V, 125 V, 160 V, 230 V, 260 V and 400 V, and for supplying at its output an output voltage signal having a predetermined value, for example 230 V.

The signal obtained from the external power source 1 is an alternating voltage signal which supplies the conversion module 4.

The conversion module 4 converts the alternating voltage signal, in a known way, to a continuous voltage signal and then it sends the signal to each of the input module 6, the management and control module 8, the amplification module 10 and the output module 12.

The input module 6 comprises an input processing unit, preferably a processor having an associated touch screen, designed to receive digital input data supplied by a user and to send them to the management and control module 8. The input module 6 forms the human-machine interface and the graphics and pages of the screen display are programmable in a known way so as to facilitate the user's entry of the digital input data.

The input module 6 can be integrated into the current generator device or can be a remote processor connected in a known way to the current generator device.

The management and control module 8 is designed to generate and modify a primary voltage wave to be sent to the amplification module 10 so as to enable an output current wave to be generated at the output.

The amplification module 10 is preferably a power amplifier designed to receive the primary voltage wave and amplify it to produce a final voltage wave.

The output module 12 comprises a transformer (provided, in a known way, with a primary and a secondary branch) designed to process, in a known way, the final voltage wave received from the amplification module 10, so as to generate the output current wave.

In the remainder of the description, the term "output current wave" is used to signify the wave present in the secondary branch of the transformer.

The secondary branch of the transformer includes an additional inductance whose value is chosen in such a way that, when it is added to the inductance of the secondary winding, the resulting value is, for example, greater by two to three orders of magnitude than the inductive impedance of the load 14, so that the load inductance is negligible relative to the total inductance present in the secondary branch.

At least one amperometric transducer of a known type is connected to the primary branch of the transformer, this transducer being designed to send a signal representing the current flowing through it to the management and control module 8. This intermediate signal is related in a known way (via the transformation ratio of the transformer) to the output current wave as defined above, and is used by the management and control module 8 to execute a step of the current wave generation method as described below.

At least one amperometric transducer of a known type is connected to the secondary branch of the transformer, this transducer being designed to send a signal representing the current flowing through it to the control module 8. This signal represents the output current wave present in the secondary branch as mentioned above, and is used by the management and control module 8 to execute the method described below.

The output module 12 is advantageously connected to a switch capable of disconnecting the output module 12 and allowing the processing unit 2 to be connected to an external output module, which is substantially identical to the output module 12 and is designed to provide the same functions as the output module 12, preferably in order to operate on the basis of different ranges of values of the inductive impedance of the load 14, or in order to extend the operating range of the generator.

The digital input data allow the user to define the desired current waveform which is to be generated as the output current wave.

The output current wave (like the desired current wave) therefore comprises, in a known way, a plurality of points, each characterized by an abscissa value and an ordinate value defined within a reference system associated with the input module 6, for example a Cartesian system displayed on the screen of the computer and having its origin on the left-hand side, half way up the vertical side of said screen.

In particular, the digital input data comprise waveform parameters, such as the type of form (for example, a sinusoidal, square, triangular or other wave), quantities representing these forms (for example, the amplitude and frequency of a sinusoidal wave, the period and ON time of a square wave, the period, ramp and ON time of a triangular wave, etc.), and the maximum peak current value (for example, from 0 to 30 A, in order to obtain about 21 A r.m.s.).

In the remainder of the description the term "set point data" is used to signify only those data, belonging to the input data, which represent the instantaneous value of the desired current.

Alternatively, the digital input data comprise a plurality of points (abscissas and ordinates of the reference system described above).

The digital input data acquired in this way are sent to the management and control module 8.

In a variant of the invention, the input module 6 is designed to acquire arbitrary waveforms from instruments external to the current generator device, such as oscilloscopes, so as to derive from these known waveforms, in a known way, the digital input data to be sent to the management and control module 8.

Advantageously, the input module 6 is designed to display the values of the output current wave, for example on the same screen as that used by the user to enter the digital input data. These values, obtained by the management and control module 8 (via the connection 8a) from the output of the output module 12, are sent by the management and control module to the input module 6 via the connection 6a.

Preferably, the input module 6 has an indicator lamp which is illuminated until the output current wave becomes stable. Thus the user is informed of the fact that the wave being displayed on the screen is still in a transient phase and therefore does not correspond to the desired current wave.

The management and control module 8 is designed to receive the digital input data from the input module 6 and to process them instant by instant, as described below, so as to generate first data representing the primary voltage wave to be sent to the amplification module 10.

In particular, the first data, which are numerical data, are converted in a known way into the analogue primary voltage wave which is then sent to the amplification module 10.

In the remainder of the description, all the operations described are considered to be executed instant by instant on point values.

In the remainder of the description the term "voltage data" is used to signify only those data, belonging to the first data, which represent the voltage value of the primary voltage wave. These voltage data are converted into the corresponding instantaneous voltage, for example by carrying out a conversion with a D/A converter whose minimum unit of variation corresponds to a predetermined analogue voltage range (in mV), for example 0.14 mV.

The output current wave is sent by the output module 12, via the connection 8a, to the management and control module 8, which converts it in a known way, thus producing second data representing this output current wave.

In the remainder of the description the term "current data" is used to signify only those data, belonging to the second data, which represent the instantaneous value of the output current.

Briefly, the management and control module 8 is designed to compare the second data with the input data (i.e., to compare the output current wave with the desired current wave) and to modify the first data (i.e., the primary voltage wave) until the second data become substantially equal to the input data (i.e., until the output current wave becomes substantially equal to the desired wave), as described in detail below.

In the present description, the term "substantially equal" is used to signify that the output current wave has, instant by instant, a value of current lying within a predetermined range, for example ±3% of the corresponding current value of the desired current wave.

Figure 2:
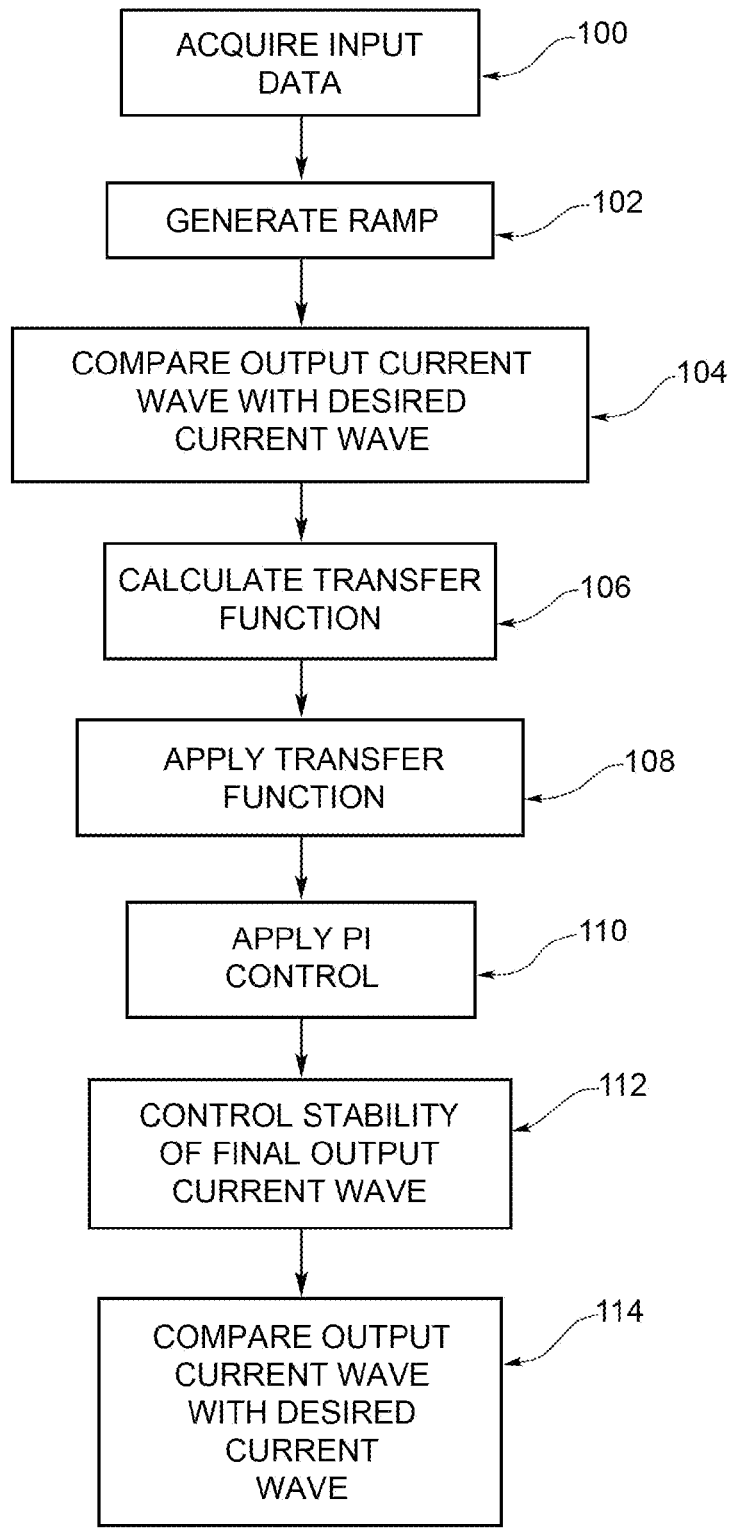
FIG. 2 is a flow chart of the operations executed by the management and control module for generating and controlling the output current wave.

In particular, the management and control module 8 executes, instant by instant, the operations shown in the flow chart of FIG. 2.

Thus, with the additional aid of the subsequent processing carried out by the amplification module 10 and output module 12, the output current wave is generated.

At the outset, the initialization values for the first data, particularly for the voltage data, are set, and these initialization values are subsequently updated on the basis of new data processed as described below by the management and control module 8.

In step 100, the management and control module 8 acquires the input data, particularly the set point data.

In step 102, it progressively generates a rising primary voltage ramp such that an output current wave is obtained with a peak value which increases progressively from 0 to a predetermined percentage of the peak value of the desired current wave, for example 95%.

In order to generate said ramp, the management and control module 8 converts the voltage data by means of the aforementioned D/A converter, thus obtaining, in a known way, the primary voltage wave which, when amplified by the amplification module 10 and processed by the output module 12, becomes the output current wave.

As mentioned above, the output current wave is sent at this point, via the connection 8a, to the management and control module 8, which, in step 104, compares it (having converted it to obtain the second data) with the desired current wave (by performing a comparison between the second data and the input data). If these waves are not substantially equal (in other words, if the output current wave does not have, instant by instant, a value lying within a predetermined range, for example ±3%, of the corresponding level of the desired current wave), the procedure continues as shown below.

In this step 102, the "output current wave" is considered to be the intermediate signal supplied by the amperometric transducer located in the primary branch of the transformer of the output module 12.

Alternatively, the signal supplied by the amperometric transducer located in the secondary branch of this transformer can be used.

Additionally, in order to generate the ramp, the management and control module 8 calculates, in a known way, the phase difference between the desired current wave and the output current wave generated in step 102. For example, this phase difference $\Delta\phi$ is calculated as follows:

$$\Delta\varphi = \left(\frac{P_{x\_MAX} + P_{x\_min}}{2}\right)_{output} - \left(\frac{P_{x\_MAX} + P_{x\_min}}{2}\right)_{desired}$$

where $P_{x\_MAX}$ denotes the position (abscissa) of the point at which there is a maximum current peak, $P_{x\_min}$ denotes the position (abscissa) of the point at which there is a minimum current peak, output denotes the output current wave, and desired denotes the desired current wave.

The phase difference $\Delta\phi$ is used, in a known way, in all the steps shown below, when reference is made to the use of instantaneous data used to execute the operations described from time to time.

In fact, the phase difference $\Delta\phi$ allows to process corresponding points of the desired current wave and of the output current wave.

If, at a predetermined instant of time $t_x$, it is desired to acquire a given data element (corresponding to an analogue value of a given current wave, for example a desired or output current wave), the current generator device returns this data element at the instant of time $t_x+\Delta\phi$, in other words after a delay due to the electrical inertia of the device (the time constants).

The knowledge of the phase difference $\Delta\phi$ is very important because it enables us to know which data element (analogue value) is to be considered at the instant of time $t_x$ in order to correct or modify the corresponding point which will be transmitted at the instant of time $t_x+T$, where T is the period of the wave in question.

For the sake of simplicity, therefore, in the remainder of the description only the instantaneous values of the desired current wave and the output current wave will be shown, although the application of the phase difference $\Delta\phi$ must always be included in these, in a known way, when corresponding points belonging to the two different waves are to be placed in relation to each other.

If the output current wave is not substantially equal to the desired current wave, in step 106 the management and control module 8 calculates the transfer function, in a known way, in order to determine the ratio between the output current wave and the primary voltage wave.

The management and control module 8 therefore calculates, instant by instant, the ratio between the output current data and the voltage data, thus obtaining third data representing the amplification ratio between the two analogue waves.

In step 108, the management and control module 8 applies the transfer function in order to obtain a new primary voltage wave which corresponds to a new output current wave which has, instant by instant, a value lying within a predetermined range, for example ±3% of the corresponding value of the desired current wave.

In particular, the management and control module 8 calculates the ratio between the set point data and the third data in order to apply the transfer function, thus obtaining new voltage data.

The steps 102, 104, 106 and 108 are then repeated until a primary voltage wave is obtained which corresponds to an output current wave which has, instant by instant, last output current data whose difference from the set point data lies within a predetermined range, for example ±3%.

Figure 3:
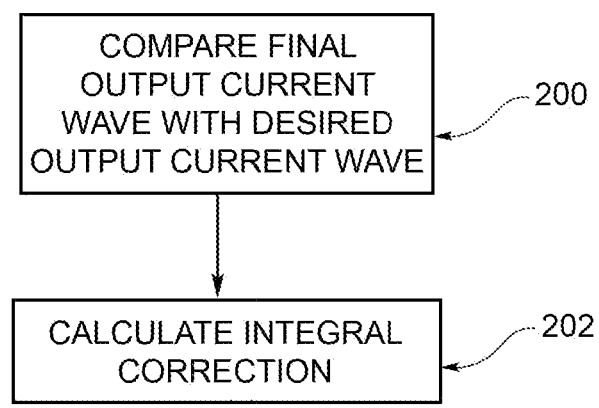
FIG. 3 is a flow chart of the operations executed by the management and control module for applying PI control to the output current wave.

At this point, in step 110 the management and control module 8 applies PI (proportional-integral) control to the primary voltage wave, by executing the operations shown in the flow chart of FIG. 3.

The PI control must be such that the primary voltage wave is modified so that the output current wave remains in stable conditions. Since the operation takes place in non-linear conditions in this step of the method, it is necessary to maintain, as far as possible, the equilibrium situation achieved at the end of the preceding steps, without making abrupt corrections which would have a destabilizing effect.

In particular, the PI control comprises, instant by instant, a step 200 of comparison between the set point data and the last output current data (proportional correction).

If these last output current data are less than the set point data, the voltage data are increased by a predetermined quantity, for example by a minimum unit of variation of the D/A converter.

On the other hand, if the last output current data are greater than the set point data, the voltage data are decreased by a predetermined quantity, for example by the minimum unit of variation of the D/A converter.

In step 202, the management and control module 8 then performs the calculation of an integral correction to be applied to the voltage data increased or decreased as described above.

In particular, the voltage data are newly increased by an integral value calculated as described herein.

The integral value is a sum data element obtained by the algebraic summation of the errors present between the set point data and the output current data. Preferably, this integral value is multiplied by a predetermined reduction factor, for example $5*10^{-6}$.

The integral value is calculated as follows: during the execution of the preceding steps, the management and control module 8 calculates the difference between the set point data and the output current data generated from time to time (the difference between the desired current wave and the output current wave), obtaining a plurality of difference data. These difference data are added algebraically, thus obtaining the aforementioned sum data element. Finally, as mentioned above, the sum data element is multiplied by the reduction factor.

At this point, the PI correction is terminated and a final output current wave appears at the output (this wave being generated from the primary voltage wave whose voltage data have been increased and decreased previously as a result of the proportional correction followed by the integral correction) and is associated with final output current data.

It should be noted that the steps of the PI correction have been described above as if they were sequential, but in reality the management and control module 8 executes steps 200 and 202 in an asynchronous manner, these steps therefore being completed almost simultaneously, so that the voltage data are modified together in a single instant on the basis of the results of these steps.

At this point, returning to FIG. 2, the method moves to a subsequent step 112 in which the stability of the final output current wave is controlled.

For this purpose, the final output current wave in a given period is compared with the final output current wave generated in the preceding period (comparison between corresponding points of the wave in two successive periods), thus obtaining a difference between the root mean square deviations of these waves.

In particular, the root mean square deviation of the final output current wave at a given instant t ($SQM_t$) is calculated, together with the root mean square deviation of the same wave at the instant corresponding to t belonging to the preceding period T ($SQM_{t-T}$), and the difference between these is found.

In particular, for each point of the final output current wave in a given instant t, the difference between this point and the respective point of the final output current wave in the preceding period t−T is calculated. The sum of all these differences forms a first difference datum d1.

If d1 is greater than a first predetermined threshold, for example 35, steps 110 and 112 are repeated until d becomes less than the threshold.

If d1 is less than said first threshold, in step 114 the final output current wave is compared with the desired current wave and a check is made as to whether they are coincident.

In the present description, the term "coincident" is used to signify that the final output current wave is identical to the desired current wave at the limit of the physical accuracy of the current generator device.

For this purpose, the root mean square deviation of the desired current wave ($SQM_{desired}$) is calculated, together with the root mean square deviation of the final output current wave ($SQM_{final}$), and the difference between these is found.

In particular, for each point of the desired current wave, the difference between this point and the respective point of the final output current wave is calculated. The sum of all these differences forms a second difference datum d2.

If d2 is less than a second predetermined threshold, for example 500, the method terminates because the limit of the accuracy of the current generator device has been reached.

If d2 is greater than the second threshold, a predetermined offset is added to the set point data (for example, by increasing them by a predetermined number of amperes, for instance 1 mA), and the method starts again from step 100. Thus any non-linearities which prevent the improvement of the correction are compensated, while the set point data entered initially by the user are maintained.

Clearly, provided that the principle of the invention is retained, the forms of application and the details of embodiment can be varied widely from what has been described and illustrated purely by way of non-limiting example, without thereby departing from the scope of the invention as defined in the attached claims.

The invention claimed is:

1. Current generator device comprising a processing unit (2) comprising:
    an input module designed to acquire input data representing a desired current wave;
    a management and control module connected to the input module and designed for:
        receiving the input data representing the desired current wave; and
        generating a primary voltage wave;
    an output module connected to the management and control module and designed to receive the primary voltage wave and to process the primary voltage wave so as to generate an output current wave,
    said management and control module being further designed for:
        receiving the output current wave from the output module; and
        comparing said output current wave with the desired current wave and, if they are not substantially equal, modifying the primary voltage wave so as to obtain a new output current wave substantially equal to the desired current wave; and
    an amplification module placed between the management and control module and the output module and designed to receive the primary voltage wave and amplify the primary voltage wave.

2. Device according to claim 1, wherein the input module (6) comprises a processor with an associated touch screen.

3. Device according to claim 1, wherein the output module (12) comprises a transformer.

4. Method of generating a current wave comprising:
    a) acquiring input data representing a desired current wave;
    b) generating a primary voltage wave;
    c) processing said primary voltage wave, thus obtaining an output current wave;
    d) comparing said output current wave with the desired current wave and, if the output current wave does not have, instant by instant, a value lying within a predetermined range of the corresponding value of the desired current wave;
    e) calculating the transfer function between the output current wave and the primary voltage wave;
    f) applying the transfer function so as to obtain a new primary voltage wave;
    g) repeating-acts c)-f) until the primary voltage wave which is obtained corresponds to an output current wave having, instant by instant, a value lying within a predetermined range of the corresponding value of the desired current wave;
    h) applying proportional-integral control to the primary voltage wave obtained at act g) so as to obtain a final output current wave;
    i) controlling the stability of the final output current wave; and
    j) comparing the final output current wave with the desired current wave and checking whether they are coincident,
    wherein the operation of applying proportional-integral control comprises the operations of:
        comparing last output current data, representing the current value of the output current wave which in act g) has a value within a predetermined range of the corresponding value of the desired current wave, with set point data belonging to the input data and representing the value of the current of the desired current wave;
        increasing or decreasing voltage data representing the voltage value of the primary voltage wave associated with the output current wave of act g), based on the result of said comparison; and
        performing the calculation of an integral correction to be applied to the voltage data modified in the preceding act, thus obtaining a final output current wave.

5. Method according to claim 4, further comprising, between act b) and act c), the operation of amplifying the primary voltage wave.

6. Method according to claim 5, wherein the operation of calculating (106) the transfer function comprises:
calculating the ratio between the output current data representing the current value of the output current wave and the voltage data representing the voltage value of the primary voltage wave, thus obtaining third data.

7. Method according to claim 6, wherein the operation of applying (108) the transfer function comprises:
calculating the ratio between set point data belonging to the input data, representing the current value of the desired current wave, and the third data, thus obtaining new voltage data.

8. Method of generating a current wave comprising:
a) acquiring input data representing a desired current wave;
b) generating a primary voltage wave;
c) processing said primary voltage wave, thus obtaining an output current wave;
d) comparing said output current wave with the desired current wave and, if the output current wave does not have, instant by instant, a value lying within a predetermined range of the corresponding value of the desired current wave;
e) calculating the transfer function between the output current wave and the primary voltage wave;
f) applying the transfer function so as to obtain a new primary voltage wave;
g) repeating-acts c)-f) until the primary voltage wave which is obtained corresponds to an output current wave having, instant by instant, a value lying within a predetermined range of the corresponding value of the desired current wave;
h) applying proportional-integral control to the primary voltage wave obtained at act g) so as to obtain a final output current wave;
i) controlling the stability of the final output current wave; and
j) comparing the final output current wave with the desired current wave and checking whether they are coincident,
wherein the operation of controlling the stability of the final output current wave comprises the operations of:
comparing the final output current wave in a predetermined period with the final output current wave generated in the preceding period by calculating the difference between the mean square deviations of said waves, thus obtaining a first difference datum (d1); and
comparing the first difference datum (d1) with a first predetermined threshold, and, if the first difference datum (d1) is greater than said first threshold, repeating acts h) and i) until the first difference datum (d1) becomes less than the first threshold.

9. Method according to claim 8, wherein the operation of comparing the final output current wave with the desired current wave comprises the operations of:
checking whether the first difference datum (d1) is less than the first threshold;
calculating the difference between the mean square deviations of the desired current wave and of the final output current wave, thus obtaining a second difference datum (d2);
comparing the second difference datum (d2) with a second predetermined threshold and,
if the second difference datum (d2) is less than said second threshold, terminating the method; and
if the second difference datum (d2) is greater than said second threshold, adding a predetermined offset to the input data and repeating acts b)-j) until a second difference datum (d2) which is less than said second threshold is obtained.

* * * * *